United States Patent [19]
Marie et al.

[11] Patent Number: 5,314,051
[45] Date of Patent: May 24, 1994

[54] FRICTION CLUTCH FOR A MOTOR VEHICLE, AND AN ELASTIC DIAPHRAGM FOR SUCH A CLUTCH

[75] Inventors: Eric Marie, Amiens; Pierre-Marie Deroo, Villers Bocage, both of France

[73] Assignee: Valeo, Paris, France

[21] Appl. No.: 83,171

[22] Filed: Jun. 29, 1993

[30] Foreign Application Priority Data

Jul. 1, 1992 [FR] France ............................ 92 08107

[51] Int. Cl.⁵ .............................................. F16D 13/44
[52] U.S. Cl. ........................... 192/89.22; 192/89.23; 192/89.24; 192/89.25
[58] Field of Search ......... 192/89 BL, 89 PH, 89 PL, 192/89 SD, 70.27

[56] References Cited

U.S. PATENT DOCUMENTS

| | | | |
|---|---|---|---|
| 2,277,221 | 3/1942 | Gamble | 192/70.27 |
| 3,773,155 | 11/1973 | Fujita et al. | 192/89 PH X |
| 4,114,742 | 9/1978 | Rawlings | 192/89 PH |
| 4,300,669 | 11/1981 | Browne | 192/89 B |
| 4,629,048 | 12/1986 | Draper et al. | 192/70.27 |
| 4,720,002 | 1/1988 | Kitano et al. | 192/89 PL X |
| 4,744,448 | 5/1988 | Maycock et al. | 192/89 PH X |
| 4,751,991 | 6/1988 | Naudin | 192/89 B |
| 4,754,860 | 7/1988 | Fukutake et al. | 192/89 PL X |
| 4,811,474 | 3/1989 | Maucher et al. | 192/89 PH X |
| 4,828,092 | 5/1989 | Kohler | 192/70.27 X |
| 4,895,235 | 1/1990 | Nishimura et al. | 192/89 PL X |
| 4,940,126 | 7/1990 | Floton et al. | 192/89 PL |

FOREIGN PATENT DOCUMENTS

| | | | |
|---|---|---|---|
| 1260890 | 7/1963 | Fed. Rep. of Germany | 192/89 B |
| 2820412 | 11/1978 | Fed. Rep. of Germany | 192/89 B |
| 2238863 | 3/1975 | France | 192/89 B |
| 2563877 | 11/1985 | France | . |
| 2585424 | 1/1987 | France | . |
| 2180017 | 3/1987 | France | . |
| 537359 | 6/1941 | United Kingdom | 192/89 B |
| 2149463 | 6/1985 | United Kingdom | . |
| 2158183 | 11/1985 | United Kingdom | . |

*Primary Examiner*—Leslie A. Braun
*Assistant Examiner*—Andrea Pitts
*Attorney, Agent, or Firm*—Longacre & White

[57] ABSTRACT

A friction clutch for a motor vehicle comprises a cover plate and a pressure plate, with an elastic diaphragm between them. The diaphragm has an outer peripheral portion which is formed with two concentric annular ribs projecting axially and defining respective convexities which are oriented in opposite directions. Each of these convexities cooperates with a respective surface portion formed in facing relationship with the diaphragm on a corresponding one of the members comprising the pressure plate and the cover plate. The diaphragm having these ribs has a cross section, taken in an axial plane through the annular peripheral portion of the diaphragm, which is substantially in the form of a letter S or Z.

8 Claims, 3 Drawing Sheets

FRICTION CLUTCH FOR A MOTOR VEHICLE, AND AN ELASTIC DIAPHRAGM FOR SUCH A CLUTCH

FIELD OF THE INVENTION

The present invention relates to a friction clutch, especially for a motor vehicle. More particularly, the invention is concerned with a friction clutch comprising a cover plate and a pressure plate, with an elastic diaphragm arranged between them, the said diaphragm being frustoconical in the free state and comprising an outer peripheral portion of substantially annular shape, the inner edge of which is extended radially by a series of elastic fingers having free ends which co-operate with a clutch manoeuvring member, which is displaceable parallel to the axis of the clutch, wherein the two opposed faces of the annular peripheral portion of the diaphragm co-operate respectively with an engagement defined on the pressure plate in facing relationship with the diaphragm, and with an engagement element defined on the internal face of the cover plate, again in facing relationship with the diaphragm.

The outer peripheral portion of the diaphragm defines a Belleville ring, and the fingers of the diaphragm are separated from each other by slots.

The clutch also has a clutch disc carrying friction liners which are, by virtue of the action of the diaphragm, gripped between the pressure plate and the flywheel (or reaction plate) of the clutch.

BACKGROUND OF THE INVENTION

When the driver of the vehicle pushes the clutch pedal down (in a vehicle having a clutch of the type defined above) the pedal actuates a clutch fork or declutching fork which applies the said actuating member, usually a clutch release bearing, on the free ends of the diaphragm fingers. This causes the diaphragm to tilt, so that it no longer exerts any force on the pressure plate. In consequence, the pressure plate, which is usually biased by means of return tongues, releases the clutch disc so that it is no longer coupled in rotation to the engine flywheel and the gearbox is therefore uncoupled from the engine.

In one known design, the outer peripheral portion of the diaphragm is frustoconical in its free state and is formed from sheet metal having a substantially constant thickness. It then cooperates firstly with an annular land formed on the face of the pressure plate in facing relationship with it, and secondly with another annular land which is formed in facing relationship with it on the internal face of the cover plate.

Using a conventional elastic diaphragm according to that design, the resilient force which is exerted axially by the diaphragm on the pressure plate depends essentially on the thickness of the metal from which the diaphragm is formed, and on the dimensions of the outer peripheral portion of the latter, which are determined by the angle of the frustum of a cone defined by the diaphragm.

As the travel of the clutch release bearing (or course of deformation of the diaphragm fingers) progresses, the resilient force passes through a maximum which can be quite pronounced, before again decreasing. The ratio of the depth (measured axially) of the peripheral portion of the diaphragm to the thickness of the diaphragm determines the shape of this characteristic curve of the diaphragm.

It is possible to reduce the height of the summit or peak of the curve giving the value of the elastic force as a function of the degree of deformation of the diaphragm, in particular by increasing the thickness of the metal in the diaphragm. However, the reliability and fatigue resistance of such a type of diaphragm, when made of thick metal, are then both reduced. In addition, a very thick diaphragm is difficult to manufacture by press forming, and this also increases the total weight of the clutch.

Another disadvantage of clutches of conventional design lies in the fact that the pressure plate and cover plate have to be made with axially projecting annular lands, which increases the complexity of their design and also their manufacturing costs.

It has previously been proposed, in United Kingdom patents specification GB 2158183A and the corresponding French published patent specification FR 2563877A, to reduce the maximum height of the characteristic curve of the diaphragm by making the latter in the form of an annular resilient diaphragm having a body in the form of a disc. In its unstressed state, this disc has a substantially frustoconical shape, and comprises a body of revolution defining at least one annular profiled portion which is centred on the axis of the cone and which has a concavity directed towards the exterior of the frustum of a cone. However, this is not an entirely satisfactory solution, firstly because any interference between the profiled portion of the pressure plate must be avoided, and secondly because it is still necessary to provide an annular land projecting axially on the internal face of the cover plate, and another land on the pressure plate.

DISCUSSION OF THE INVENTION

In order to overcome the above mentioned disadvantages, the invention proposes a clutch of the type defined under "Field of the Invention" above, characterized in that the annular peripheral portion of the diaphragm defines two concentric annular ribs, which project axially and which are convex in opposite directions, whereby each said rib cooperates with a respective surface portion defined, in facing relationship with it, on one of the elements comprising the pressure plate and the cover plate, and whereby also to confer, on the cross section taken through an axial plane of the annual peripheral portion of the diaphragm, a profile which is substantially in the form of a letter S or a letter Z.

According to a preferred feature of the invention, each of the surface portions formed in facing relationship with the diaphragm on the pressure plate, and on the internal face of the cover plate, is a smooth, annular surface portion which results in gentler contact between the diaphragm and these surfaces, and reduces wear in the diaphragm and also interference phenomena and/or work hardening.

According to another preferred feature of the invention, where the clutch is of the push-off type in which the clutch manoeuvring member (e.g. clutch release bearing) is displaced towards the pressure plate in order to disengage the clutch, the convexity defined by that one of the said ribs that lies radially outwardly of the other rib cooperates with that one of the said surface portions which is defined on the pressure plate in facing relationship with the diaphragm.

According to another preferred feature of the invention, where the clutch is of the pull-off type, in which the clutch manoeuvring member is displaced towards the cover plate in order to disengage the clutch, that one of the said ribs which lies radially outwardly of the other rib cooperates with the said surface portion of the cover plate, this surface portion being defined on the said internal face of the cover plate in facing relationship with the diaphragm.

According to yet another preferred feature of the invention, the diaphragm is made in sheet metal of substantially constant thickness, with only its peripheral portion being modified to form the said ribs, the diaphragm fingers being unchanged.

In addition, the ribs formed in the diaphragm of the invention lead to a reduction in wear in those parts of the diaphragm where it makes contact with the pressure plate and cover plate.

The invention also proposes an elastic diaphragm for a clutch constructed in accordance with the invention.

The invention enables both the cover plate and the pressure plate to be simplified, as well as reducing the occurrence of wear in both these components, because it is surface portions of both components that are used for engagement with the diaphragm. Furthermore, the peak of the characteristic curve of the diaphragm is reduced in height.

Other advantages and features of the invention will appear more clearly on the reading of the description which follows, of preferred embodiments of the invention. This description is given by way of non-limiting example only, and with reference to the accompanying drawings.

DESCRIPTION OF PREFERRED EMBODIMENTS OF THE INVENTION

Figure 1:
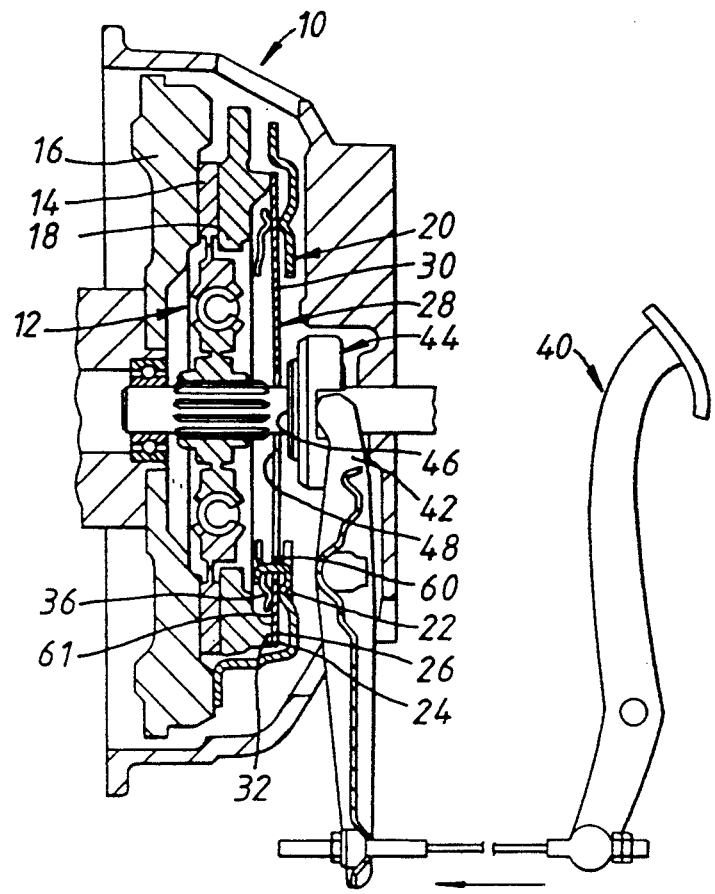
FIG. 1 is a view in axial cross section of a diaphragm-type friction clutch in accordance with the current state of the art.

The clutch 10 shown in FIG. 1 comprises a clutch disc 12, carrying friction liners 14 which are received between the parallel and opposed flat faces of an engine flywheel 16 on the one hand, and a pressure plate 18 on the other. The flywheel 16 and pressure plate 18 are carried on, and rotatable with, the crankshaft of the engine of the motor vehicle. The clutch 10 also includes a hollow cover plate 20 of annular shape, having a base portion which includes an annular land 22 which projects axially towards the interior, and which cooperates with a first lateral face 24 of the outer annular peripheral portion 26, in the form of a Belleville ring, of an elastic diaphragm 28.

The peripheral portion 26 of the diaphragm has a second lateral face 30 axially opposed to its face 24. This second lateral face 30 co-operates firstly with an annular land or bead 32, which projects axially from a lateral face 34 (see FIGS. 3 and 8) of the pressure plate 18; and secondly, with another annular land 36 which is formed on a crown ring 61.

This crown ring 61 is carried by retaining fingers 60, by which it is located axially. The retaining fingers 60 project from the cover plate 20, being formed by a pressing operation followed by bending. Each finger 60 comprises an axial portion, passing through the diaphragm 28 via holes which are formed in the latter close to the root of the radial fingers which constitute the inner portion of the diaphragm, surrounded by the Belleville ring portion 26. These holes in the diaphragm constitute the widened blind ends of the slots which separate the diaphragm fingers from each other. The free end of the axial portion of each retaining finger 60 is bent back radially in a direction away from the axis of the assembly, so as to form a bend in which the crown ring 61 is axially located. For more detail, reference is invited to the specification of U.S. Pat. No. 4,751,991 and the corresponding French published patent specification FR2585424A. The disclosure of the U.S. document is to be considered as being incorporated in the present description.

The lands 22 and 36, arranged in facing relationship to each other, define respective summits which form the primary and secondary fulcrums, respectively, for the articulation of the diaphragm 28, whereby the latter is mounted in a pivoting or tilting manner between these fulcrums 22 and 36.

Control of the clutch 10 is provided by means of a clutch pedal 40 which is coupled to a clutch fork 42 acting on a clutch release bearing 44, the nose 46 of which is arranged to cooperate with the free radially inner ends 48 of the resilient fingers of the diaphragm 28. The clutch release bearing 44 is the manoeuvring member for the clutch, and is displaced, in operation, parallel to the axis of the assembly. It is typically mounted on a guide tube which is fixed to the gearbox.

The clutch shown in FIG. 1 is of the push-off type, i.e. the type in which an axial thrust is exerted by the clutch release bearing on the diaphragm fingers so as to release the clutch. Control of the declutching operation, i.e. of disengagement of the clutch, is effected by causing the clutch release bearing 44 to be displaced axially along its guide tube towards the pressure plate 18. Normally, the diaphragm 28 urges the pressure plate 18 towards the flywheel 16, and the friction liners 14 on the clutch disc 12 are gripped between the pressure plate 18 and the flywheel 16. In this condition the clutch is engaged, the driving torque being transmitted from the engine crankshaft to the input shaft of the gearbox via the friction liners 14 and the clutch disc 12, the latter being secured to the gearbox input shaft for rotation of the latter with it, typically by means of a splined coupling.

As the friction liners 14 become worn, the tilt or inclination of the diaphragm 28 changes, the diaphragm being generally flat when the liners 14 are new, and when the clutch is engaged.

The axial displacement of the clutch release bearing 44 thus causes the diaphragm to tilt or deform between its fulcrums 22 and 36, causing lifting of the pressure plate 18, which thereby becomes displaced towards the cover plate 20 under the action of a set of tangential tongues (not shown). In a known manner, these tongues couple the pressure plate 18 with the cover plate 20 for rotation together, while permitting the axial displacement of the pressure plate 18 with respect to the cover plate 20. The displacement of the pressure plate 18 releases the friction liners 14, so that the clutch is then disengaged and the drive to the gearbox input shaft from the engine of the vehicle is thereby interrupted.

Figure 2:
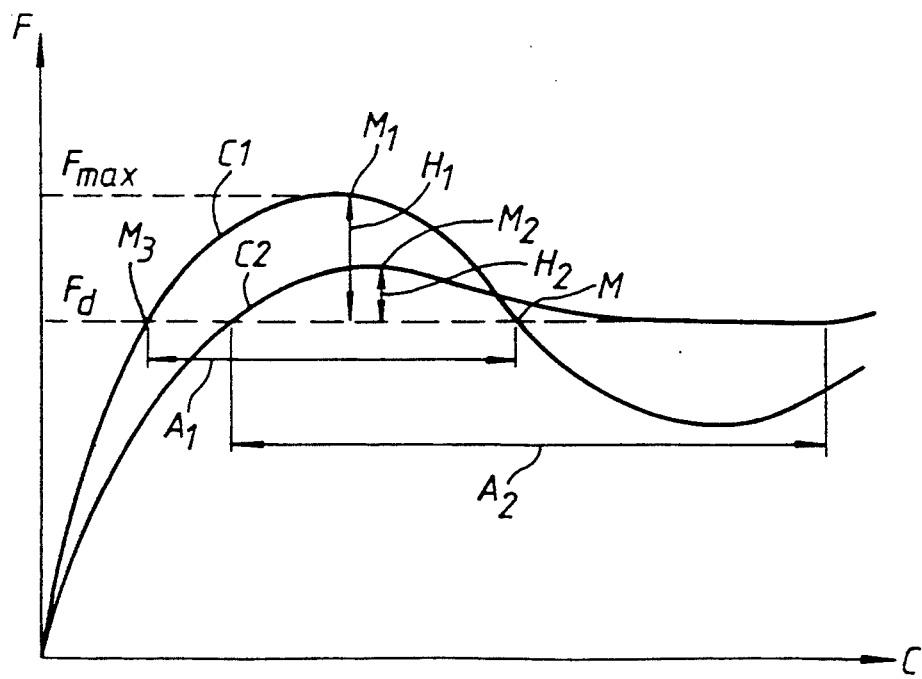
FIG. 2 is a graph giving curves which illustrate the elastic force of the diaphragm as a function of the axial travel of the clutch release bearing.

Referring now to FIG. 2, in which diaphragm force F is plotted against the axial travel C of the clutch release bearing 44, the curve C1 shows the value of the force F in relation to the clutch release bearing travel C. As can be seen, this curve, starting from the position M in which the clutch is engaged, and which varies according to the amount of wear that has taken place in the friction liners 14, increases at first and passes through a maximum $M_1$ at a Force Fmax. It then decreases rapidly and falls below the value $M_3$ where the diaphragm force Fd corresponds to the position in which the clutch is engaged when the friction liners 14 are worn.

Also shown on FIG. 2 is a height $H_1$ which is equal to Fmax $-$Fd, and the length $A_1$ of the travel of the clutch release bearing between the points M and $M_3$, over which the force F first increases and then decreases.

The embodiments of the invention which will now be described with reference to FIGS. 3 to 8 aim, in particular, to reduce the value of the height $H_1$, and to increase the length of the effective course of travel of the clutch release bearing, i.e. the effective deflection of the diaphragm, which can be used for control of the clutch.

Figure 3:
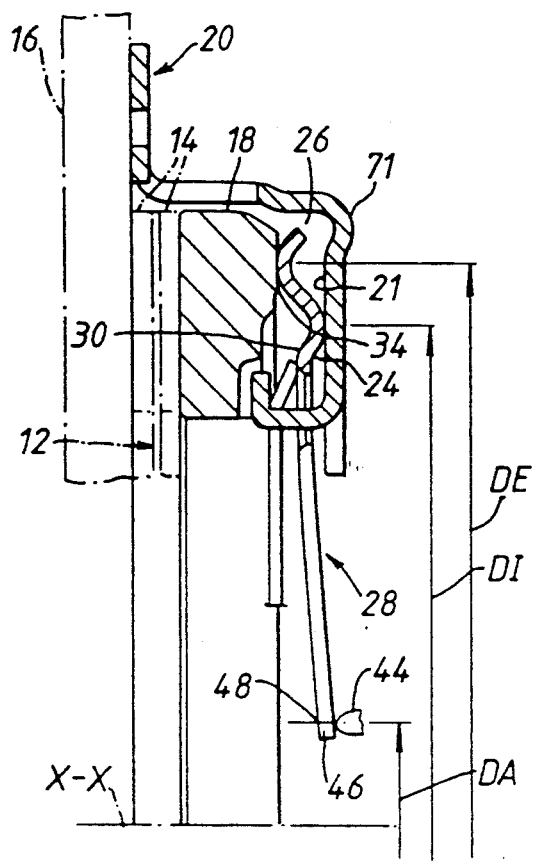
FIG. 3 is a view in axial cross section on a larger scale, showing a detail of FIG. 1 and illustrating an first embodiment of the invention as applied to a clutch of the push-off (or push to release) type, the mechanism being shown in the position in which the clutch, having new friction liners, is in the engaged position.

Referring therefore to FIG. 3, the peripheral portion 26 of the diaphragm 28, which is of generally frustoconical form in the free state, has a profile in axial cross section which is substantially in the form of a flattened letter S. In this connection, the annular peripheral portion 26 includes a first annular rib 50 (FIG. 4), which lies radially outwards, and a second annular rib 52 (FIG. 4), which is concentric with the first annular rib 50 and which is situated radially inward of the latter. The summits of the ribs 50 and 52 are rounded, so as to give a smooth point contact with the pressure plate 18 and cover plate 20 respectively. The convex axial projection defined by the first annular rib 50 cooperates with a flat surface portion 54 which is defined on the lateral face 34 of the pressure plate 18 that is directed towards the internal face 21 of the base portion of the cover plate 20. This internal face 21 is so called because it is directed towards the interior of the dished cover plate, that is to say towards the pressure plate 18.

The second or inner annular rib 52 defines a convex axial projection which is directed axially towards the cover plate 20, in the opposite direction from that of the first or outer annular rib 50. It cooperates with the internal surface 21 of the base portion of the cover plate 20, which is a flat surface portion and which lies in a radial plane that is therefore substantially at right angles to the axis X—X' of the diaphragm 28. The surface portions of the pressure plate 18 and cover plate 20 are thus flat; and wear which is caused by their contact with the diaphragm is thereby reduced.

Figure 4:
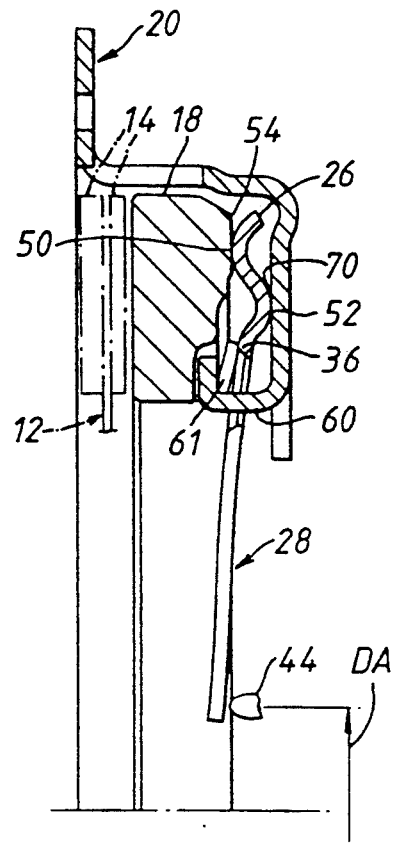
FIG. 4 is a view similar to that in FIG. 3, but shows the clutch in its disengaged position.
Figure 5:
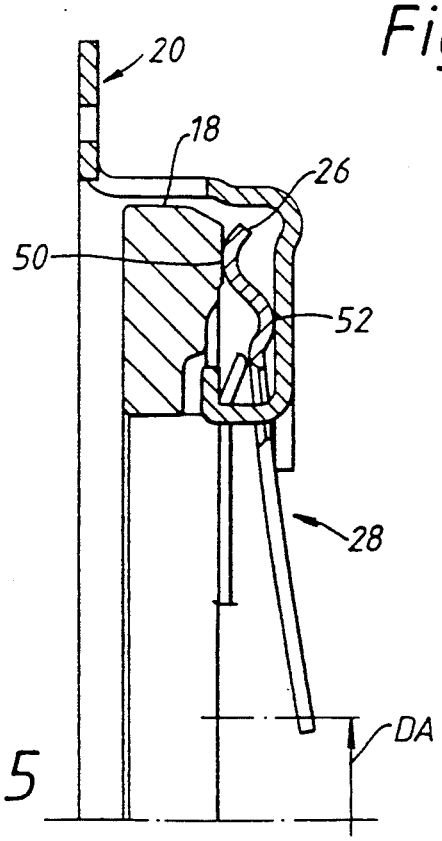
FIG. 5 is a view similar to FIG. 3, again showing the clutch in its engaged position, but with the friction liners of the clutch being worn down to their maximum permitted extent.

Referring once again to FIG. 2, the clutch constructed as shown in FIGS. 3 to 5 has a characteristic curve C2, the height $H_2$ of which is substantially reduced as compared with the height $H_1$ of the curve C1. In addition, the useful travel $A_2$ of the clutch release bearing 44 is much longer than the corresponding distance $A_1$ defined along the curve C1. As can be seen from FIG. 2, this is because the curve C2 includes a large portion which is nearly flat. The height $H_2$ leads to greater comfort for the driver. Reverting to FIG. 3, it can be seen that the pressure plate 18 is a component having a particularly simple form of construction, to the extent that it no longer includes the annular land 32 shown in FIG. 1 and projecting axially from the lateral face 34 of the pressure plate. Instead, engagement with the diaphragm is obtained from a surface portion of the lateral face 34 itself, this surface portion being flat in this example. Similarly, the internal face 21 of the cover plate 20 is also flat, while the primary fulcrum of the diaphragm is constituted by a surface portion of the cover plate 20 which cooperates directly with the second rib 52 formed in the annular peripheral portion 26 of the diaphragm 28. This arrangement not only simplifies the machining operations on the pressure plate 18 and cover plate 20, but also simplifies the tools that need to be used. It is not necessary to observe great accuracy in making these two components, so far as their surfaces for engagement with the diaphragm 28 are concerned.

In FIGS. 3 to 5, the crown ring 61 is of the same kind as that which is described in the above mentioned U.S. Pat. No. 4,751,991 and its corresponding French published patent specification FR2585424A. Accordingly, it is of frustoconical shape, and is fitted radially inwardly of the second or inner rib 52. The zone 70 of the internal face 21 of the cover plate 20 defines a primary engagement surface for the diaphragm, and is disposed on a mean circumference defining a diameter which is greater than that of the secondary fulcrum 36 defined by the crown ring 61. This simplifies the manufacture of the cover plate 20 and fingers 60. It will be noted that there is an axially projecting rounded portion 71 which joins the base portion of the cover plate 20 (having the internal face 21) to the axially oriented annular skirt portion of the cover plate 20. As will have been noticed, the latter is generally in the form of a hollow dish having a central opening in its base portion. The above mentioned rounded portion 71 prevents any contact occurring between the diaphragm 28 and the base portion of the cover plate 20, and also increases the rigidity of the latter. It is because the cover plate does not here have to be formed with a bead for engagement with the diaphragm, that this is made possible.

In addition, by comparison with diaphragms in the current state of the art, the diaphragm in the arrangements according to the invention described herein have an additional advantage. This arises from the fact that the deflection of the diaphragm causes the lever arm to be increased at the end of the travel of the clutch release bearing, so that the displacement force, and therefore the separation between the pressure plate 18 and the friction liners 14, are improved. This in turn results in a more regular wear in the friction liners, and therefore increases their useful life.

In this connection, this improved separation, for a given course of travel of the clutch release bearing, delays the occurrence of any contact, or brushing action, between the friction liners 14 and the pressure plate 18 when the clutch is disengaged. Any such contact does of course accelerate the wear in the friction liners 14. Another favourable result consists of a reduction in embedding and/or work hardening effects at the interfaces between the diaphragm and the cover plate and pressure plate, and the engagement surfaces of the cover plate and pressure plate are accessible for cleaning.

By way of example, if the diameter DE (FIG. 3) of the outer rib 50 is substantially equal to 184 mm, the internal diameter DI of the second rib 52 is substantially equal to 164 mm, and the effective actuating diameter DA of the clutch release bearing 44 is substantially equal to 34 mm, the lever arm is then equal to 6.53 in the "clutch engaged" position when the friction liners 14 are new and the diaphragm is generally flat. This is the situation shown in FIG. 3. In the situation shown in FIG. 4 in which the clutch is disengaged and the friction liners are new, the value of the lever arm is 7.03. Similarly, in the situation shown in FIG. 5 where the clutch is engaged but the friction liners are taken to be worn to their maximum permitted extent, the value of the lever arm is 6.33.

Finally, the invention may be applied by making the diaphragm from a sheet metal blank of constant thickness which is press-formed and then given a conical shape with heat treatment.

Figure 6:
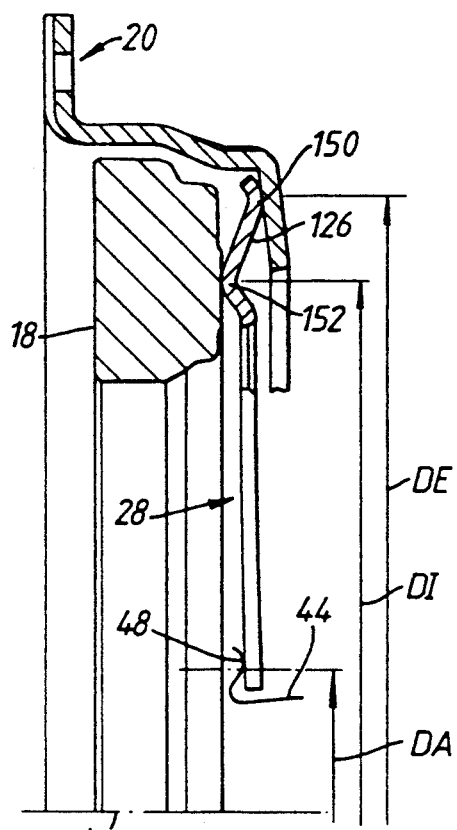
FIGS. 6 to 8 are views similar to FIGS. 3 to 5 respectively, but show a second embodiment in which the clutch is of the pull-off (or pull to release) type.
Figure 7:
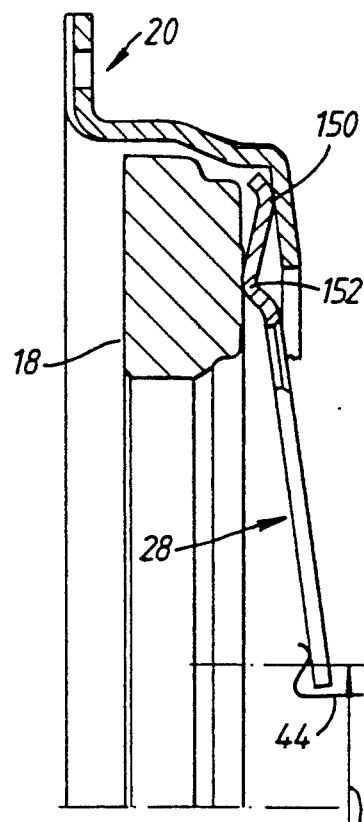
Figure 8:
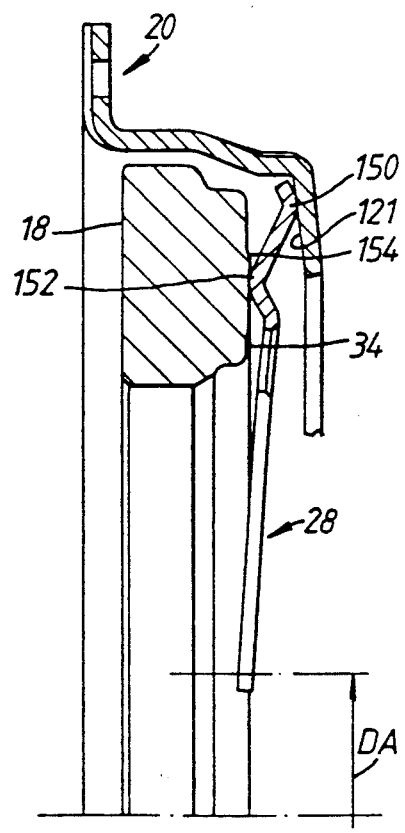

Reference is now made to FIGS. 6 to 8, showing one embodiment of the invention as applied to a clutch of the pull-off type. In these Figures, the outer annular peripheral portion 126 of the diaphragm 28, of frustoconical shape in the free state, has, in axial cross section, a profile in the form of a flattened letter Z. In this version, the first rib 150, lying radially outwardly of the other rib 152, cooperates with a surface portion of the internal face 21 of the cover plate 20, while the second rib 152 cooperates with the flat surface portion 154 of the pressure plate 18. In this example, the internal face 21 of the cover plate 20 is frustoconical in shape, so as to avoid any interference with the diaphragm. The summits of the ribs 150 and 152 are rounded so as to give smooth line contact with the cover plate 20 and pressure plate 18.

With typical, but non-limiting, values DE=205 mm, DI=177 mm and DA=48 mm, the value of the lever arm is equal to 5.73, 5.90 and 5.72 respectively in the positions shown in FIGS. 6 to 8 (i.e. with the clutch engaged and new liners; clutch disengaged and new liners; and clutch disengaged with liners worn to their maximum permitted extent, respectively).

Again, in the arrangement shown in FIGS. 6 to 8, the cover plate 20 and the pressure plate 18 are simplified and are without lands, the engagement surface portions of these components being smooth just as they were in the arrangement shown in FIGS. 3 to 5.

The present invention is of course not limited to the embodiments described above. In particular, due to the fact that only the peripheral portion of the diaphragm is modified in the case of a push-off type clutch, the assembly means which mount the diaphragm pivotally on the cover plate may comprise a set of axial spacer bars in place of the fingers 60.

In all cases, the secondary engagement element or fulcrum 36 acts on the face of the diaphragm which is directed away from the internal face 21 of the cover plate 20, and is located radially inwardly of the second rib 52 or 152. The clutch may have two friction discs and two pressure plates.

It is even possible to provide a standard pressure plate for both push-off and pull-off type clutches. To this end, it is merely necessary to extend the flat surface 54 inwardly in FIG. 4.

In every case, the occurrence of wear in the pressure plate and cover plate is reduced because the lever arm varies, and because the diaphragm is able to bear through its ribs, with their rounded summits, not locally but over extended surfaces.

What is claimed is:

1. A friction clutch comprising: a cover plate; a pressure plate; and a resilient diaphragm between the said cover plate and pressure plate, the said diaphragm having a frustoconical shape in a free state and comprising an outer peripheral portion of substantially annular shape and a series of resilient fingers extending radially inwardly from the said outer peripheral portion, the said fingers having free ends, the cover plate, pressure plate and diaphragm defining an axis of the clutch, the said free ends of the diaphragm fingers being arranged for cooperation with a clutch manoeuvring member displaceable parallel to the said clutch axis, the said outer annular peripheral portion of the diaphragm having two opposed faces, the pressure plate defining a first engagement element in facing relationship with the diaphragm, and the cover plate having an internal face defining a second engagement element in facing relationship with the diaphragm, wherein the said outer annular peripheral portion of the diaphragm defines a first annular rib and a second annular rib radially inward of the first annular rib and concentric therewith, the said ribs projecting axially and defining respective convexities oriented in opposite directions, the said first and second engagement elements being surface portions of the pressure plate and cover plate respectively, with each said rib cooperating with a respective one of the said surface portions, whereby the said outer annular peripheral portion, of the diaphragm has a profile substantially in a form of a letter S or Z in its cross section taken through an axial plane thereof.

2. A clutch according to claim 1, wherein each said surface portion is annular and smooth.

3. A clutch according to claim 2 of a push-off type, in which a said diaphragm fingers are arranged to be urged by a said clutch manoeuvring member towards the pressure plate so as to disengage the clutch, wherein the said convexities of the first and second ribs are arranged in cooperating relationship with the said surface portions of the pressure plate and cover plate respectively, the said surface portion of the cover plate being the said internal surface thereof.

4. A clutch according to claim 3, wherein each said surface portion is flat.

5. A clutch according to claim 3, further including means defining a secondary engagement element and carried by the cover plate, with the said secondary element defining a circumference having a first diameter, the said second rib defining a mean circumference having a diameter greater than said first diameter, the diaphragm having a face directed away from the said internal face of the cover plate, with the said secondary engagement element acting on said face of the diaphragm.

6. A clutch according to claim 3, wherein the cover plate is in the form of a hollow dish having a base portion, a skirt portion, and a rounded portion joining the base portion to the skirt portion whereby to avoid any interference between the said first rib and the cover plate.

7. A clutch according to claim 1 of a pull-off type, in which the said free ends of the diaphragm fingers are arranged to be displaced towards the cover plate by a said clutch manoeuvring member, wherein the said surface portion of the cover plate is defined on the said internal face thereof and cooperates with the convexity of the said first rib, the said surface portion of the pressure plate cooperating with the convexity of the said second rib.

8. A clutch according to claim 1, wherein the diaphragm is formed from sheet metal of substantially constant thickness, its said ribs having rounded summits.

* * * * *